(No Model.) 2 Sheets—Sheet 1.

H. C. CROWELL.
FRICTION CLUTCH.

No. 501,925. Patented July 25, 1893.

WITNESSES
F. J. Bassett
F. Einfeldt

INVENTOR
Hiten C. Crowell
By H. Sturgeon
Atty.

(No Model.) 2 Sheets—Sheet 2.
H. C. CROWELL.
FRICTION CLUTCH.
No. 501,925. Patented July 25, 1893.
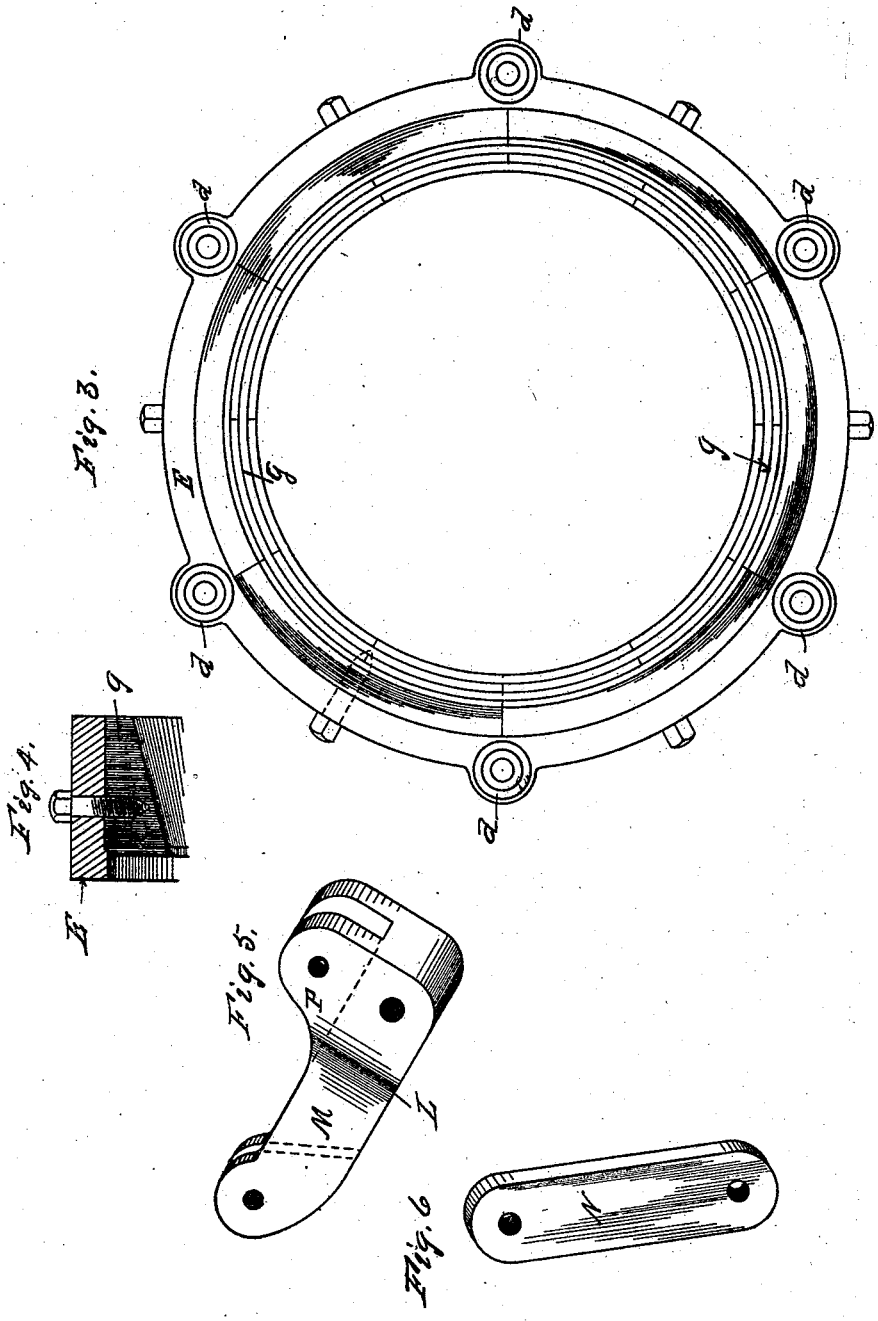
WITNESSES
F. J. Barrett
F. Einfeldt
INVENTOR
Hilon C. Crowell
By H. Turgwin
Atty.

UNITED STATES PATENT OFFICE.

HILEN C. CROWELL, OF DUNKIRK, NEW YORK.

FRICTION-CLUTCH.

SPECIFICATION forming part of Letters Patent No. 501,925, dated July 25, 1893.

Application filed November 14, 1892. Serial No. 451,915. (No model.)

*To all whom it may concern:*

Be it known that I, HILEN C. CROWELL, a citizen of the United States, residing at Dunkirk, in the county of Chautauqua and State of New York, have invented certain new and useful Improvements in Friction-Clutches; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention consists in the improvements in friction clutches, hereinafter set forth and explained and illustrated in the accompanying drawings, in which—

Figure 1:
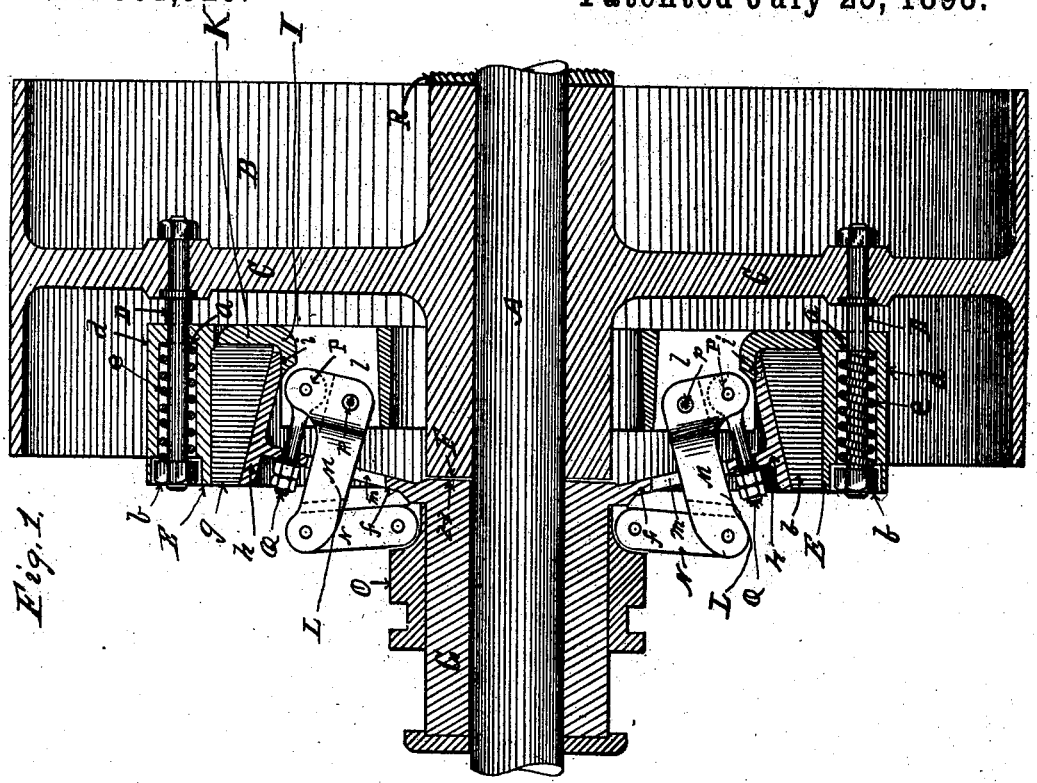
Figure 2:
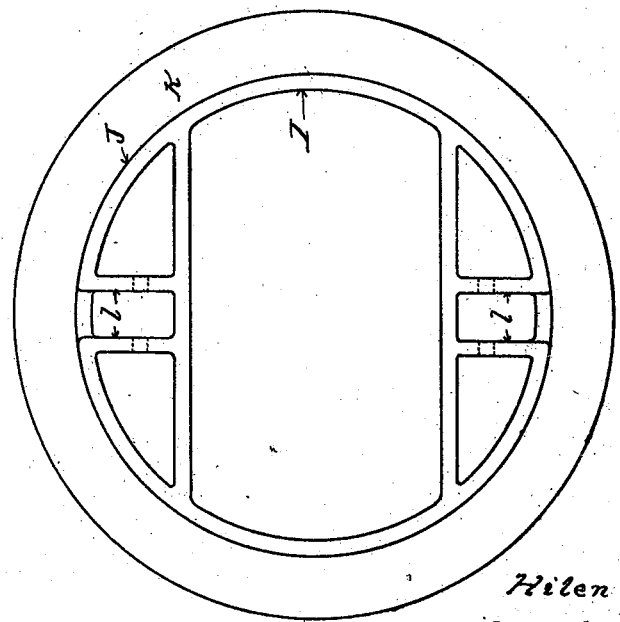

Figure 1. is a central longitudinal section of my improved clutch. Fig. 2. is a view in elevation of the movable ring operating against the clutch ring. Fig. 3. is a view in elevation of the clutch ring. Fig. 4. shows a transverse section of the clutch ring. Figs. 5 and 6. are perspective views of the operating lever and link connecting the same to the sleeve on the hub of the clutch for operating the same.

In the construction of my improved friction clutch shown in the accompanying drawings A is the shaft, and B a loose pulley operating and secured against longitudinal movement thereon. In the spokes C of the pulley B are secured stud bolts D extending laterally therefrom, and through ears $d$ on the periphery of a clutch ring E so as to slide freely in and out thereon toward and from the spokes C of the pulley B; these ears $d$ are also bored out for nearly their whole length enough larger to admit of the insertion of the springs $e$ around the stud bolts D which springs are secured in place thereon by means of the nuts $b$, which compress the springs $e$ against the rear ends $a$ of the ears $d$ and thereby operate to force the entire clutch ring E inward upon its supporting stud bolts D.

Upon the shaft A close to the end F of the pulley hub, I securely key a hub G, from the inner end H of which arms or a web $f$ projects radially at such an angle as will preferably bring the outer edge thereof where it joins and is secured to an inclined friction ring $h$ as close to the arms of the pulley as possible. This friction ring $h$ preferably has its face inclined at a considerable angle so that the inclined faces of the friction blocks $g$ secured in the clutch ring E will contact completely therewith when the clutch mechanism is in contact as illustrated in Fig. 1.

Between the spokes C of the pulley and the fixed web $f$, I insert a loose ring I which is supported by the contact of its peripheral surface J with an annular face $i$ on the inside of the inner end of the friction ring $h$ so that it will slide in and out freely therein; this ring I is also provided with a radially projecting flange K adapted to contact with the inner ends $j$ of the friction blocks $g$ of the clutch ring E, as the ring I is moved toward the fixed web $f$ and force the inclined faces of the friction blocks $g$ against the correspondingly inclined face of the fixed friction ring $h$; the springs $e$ operating to force the clutch ring E back out of contact therewith, when the pressure of the loose ring I thereon is removed. For moving this loose ring in and out as above described I pivot bell-crank levers L between the arms $l\,l$ therein, the long arms M of which extend outward through openings $m$ in the web $f$, where links N are coupled thereto connecting them with a sliding shifting sleeve O mounted on the hub G. To the short ends P of the bell-crank levers L, I pivot one end of an eye bolt Q, which is secured in the fixed web $f$, so as to be adjusted in and out, to compensate for wear, or for the proper regulation of the contact of the friction blocks of the clutch ring with the surface of the friction ring.

From the foregoing description it will be seen that the moving of the shifting sleeve O inward operates the bell-crank levers L so as to draw the loose ring I outward toward the fixed web $f$; the flange K on said ring I contacting in such movement with the inner ends $j$ of the friction blocks $g$ of the clutch ring E, and thereby carrying the clutch ring E outward until the faces of the friction blocks $g$ thereon contact with the periphery of the friction ring $h$, and when the shifting sleeve O is moved outward it operates the bell-crank lever L in the opposite direction thereby moving the loose ring I inward, so as to permit the springs e to force the clutch ring E back out of contact with the friction ring h.

I have thus described a convenient mechanism for utilizing my invention, the essential feature of which is a fixed friction ring, a laterally movable clutch ring operated by springs in one direction, a loose ring rotating in unison with the fixed portion of the clutch mechanism for operating the clutch ring in the opposite direction, and bell-crank levers, links and a shifting sleeve, for operating said loose ring.

Therefore, I do not desire to confine myself to the exact construction of my invention herein shown and described, as

What I claim as new, and desire to secure by Letters Patent of the United States, is—

1. The combination in a friction clutch, of an annular friction ring fixed to a shaft and a loose ring moving annularly with and supported by said fixed ring, and also moving longitudinally thereon, with a loose annular clutch ring, adapted to be brought into contact with the fixed friction ring by the longitudinal movement of said loose ring, and released therefrom by springs operating on said loose clutch ring, and bell-crank lever mechanism connecting said fixed portion of the clutch with said loose ring sliding thereon, for the purpose set forth.

2. The combination in a friction clutch, of an inclined friction ring fixed to the shaft, a loose pulley secured against longitudinal movement on the shaft, and an inclined faced clutch ring, mounted on studs in the arms of said pulley so as to move laterally thereon, with springs for moving said clutch ring in one direction, and a loose ring moving annularly in unison with the fixed friction ring, and bell-crank levers for moving it longitudinally, substantially as set forth.

3. The combination in a friction clutch, of the longitudinally moving annular clutch ring E and the springs e for moving it toward the arms of the pulley upon which it is mounted, with the fixed annular friction ring h, the longitudinally sliding ring I mounted and moving longitudinally in the fixed friction ring h, the bell-crank lever L mounted in said loose ring I, the bolt or link Q connecting one arm of said bell-crank lever with the web f of fixed friction ring h, and the link N connecting the other arm of said bell-crank lever with the shifting sleeve O, substantially as and for the purpose set forth.

In testimony whereof I affix my signature in presence of two witnesses.

HILEN C. CROWELL.

Witnesses:
 GEO. M. NEWTON,
 FRED D. LIGHT.